United States Patent
Lim et al.

(10) Patent No.: US 6,646,706 B2
(45) Date of Patent: Nov. 11, 2003

(54) FRINGE FIELD SWITCHING MODE LIQUID CRYSTAL DISPLAY HAVING STRUCTURE FOR PREVENTING SHORTS BETWEEN TWO ELECTRODES

(75) Inventors: Kyu Hwan Lim, Seoul (KR); Hyang Yul Kim, Kyoungki-do (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 224 days.

(21) Appl. No.: 09/870,971

(22) Filed: May 31, 2001

(65) Prior Publication Data

US 2001/0048500 A1 Dec. 6, 2001

(30) Foreign Application Priority Data

May 31, 2000 (KR) .......................... 2000-29776

(51) Int. Cl.⁷ .......................... G02F 1/136; G02F 1/1343
(52) U.S. Cl. .......................... 349/141; 349/43
(58) Field of Search .................... 349/43, 141

(56) References Cited

U.S. PATENT DOCUMENTS

| | | | |
|---|---|---|---|
| 5,745,207 A | * 4/1998 | Asada et al. | 349/141 |
| 5,760,856 A | * 6/1998 | Yanagawa et al. | 349/141 |
| 5,986,735 A | * 11/1999 | Komatsu | 349/128 |
| 5,995,186 A | * 11/1999 | Hiroshi | 349/141 |
| 6,362,858 B1 | * 3/2002 | Jeon et al. | 349/43 |

* cited by examiner

Primary Examiner—Julie-Huyen L. Ngo
(74) Attorney, Agent, or Firm—Ladas & Parry

(57) ABSTRACT

Disclosed is a fringe field switching mode liquid crystal display. The fringe field switching mode liquid crystal display of the present invention comprises a transparent insulating substrate; a plurality of gate bus line arranged in selected direction on the transparent insulating substrate, the gate bus line is arranged so that each element of the pair separated at a first distance is arranged a plurality of pairs at a second distance wider than a first distance; a plurality of common bus lines arranged on the centers of each gate bus line separated at the second distance, being in parallel with the gate bus line; a plurality of data bus lines arranged crossing with the gate bus line and common bus line to define a unit pixel; a thin film transistor disposed at the intersection of the gate bus line and data bus line; a counter electrode disposed in a unit pixel area and made of a transparent conductor, being in contact with the common bus line; and a pixel electrode overlapping with the counter electrode in the unit pixel and made of a transparent conductor, being in contact with the thin film transistor.

5 Claims, 4 Drawing Sheets

FRINGE FIELD SWITCHING MODE LIQUID CRYSTAL DISPLAY HAVING STRUCTURE FOR PREVENTING SHORTS BETWEEN TWO ELECTRODES

BACKGROUND OF THE INVENTION

1. Field of the Invention

The present invention relates to a fringe field switching mode liquid crystal display, and more particularly a fringe field driving liquid crystal display in which the structure is transformed to prevent shorts between a gate bus line and a common bus line.

2. Description of the Related Art

A thin film transistor liquid crystal display (hereinafter referred as TFT-LCD) generally has advantages of light weight, thin thickness and low power consumption. Therefore, it has been substituted for Cathode-ray tube (CRT) in a terminal of information apparatus and a video unit, and recently, it is widely used in a notebook PC and monitor market.

The TFT-LCD comprises an array substrate and a color filter, which are combined with a liquid crystal layer interposed between them. The array substrate has a structure that TFTs are disposed in each pixel arranged in a matrix type and the color filter substrate has a structure that a red, a green and a blue color filters are arranged corresponding to each pixel.

The TFT-LCD has been adopted TN (Twist Nematic) mode as a driving mode, however, the TN mode LCD has a disadvantage of narrow viewing angle. Accordingly, in order to solve the problem, an In-Plain Switching (hereinafter referred as IPS) mode has been proposed.

The IPS mode LCD has a wide viewing angle, however, it has disadvantages of a low aperture ratio and a low transmittance since a counter electrode and a pixel electrode are made of opaque metals. A fringe field switching (hereinafter referred as FFS) mode LCD has been proposed in order to improve the aperture ratio and transmittance of the IPS mode LCD.

In the FFS mode LCD, the counter electrode and the pixel electrode are made of transparent conductors and are designed which the distance between electrodes is narrower than that between substrates. And liquid crystals having negative dielectric anisotropy are used in the FFS mode LCD. Accordingly, a fringe field is formed between the electrodes and the liquid crystals on the electrodes are also driven by the fringe field, thereby realizing high brightness as well as wide viewing angle.

FIG. 1 shows an array substrate of a conventional FFS mode LCD. As shown in FIG. 1, a gate bus line (2) and a data bus line (6) are cross-arranged, thereby defining a unit pixel area. A TFT (10) is arranged as a switching device near the intersection of the gate bus line (2) and the data bus line (6). The TFT (10) comprises a gate electrode that is a part of the gate bus line, a semiconductor layer (3) on the gate electrode, a drain electrode (6b) overlapping with one side of the semiconductor layer (3), being protrude from the data bus line (6), and a source electrode (6a) overlapping with the other side of the semiconductor layer (3).

A counter electrode (5) is disposed in a unit pixel area. The counter electrode (5) made of a transparent conductor and has a plate shape. A part of the counter electrode (5) is electrically in contact with a common bus line (4), thereby continuously applying common signals from the common bus line (4).

The common bus line (4) comprises a first part (4a) disposed in parallel with the gate bus line (2), being electrically in contact with the counter electrode (5) and a second part (4b) which is extended from the first part (4a) to be in parallel with the data bus line (6) in a unit pixel, being in contact with both edges of the counter electrode (5) to be a shading means.

A pixel electrode (7) is disposed in a unit pixel to overlap with the counter electrode (5). The pixel electrode (7) made of a transparent conductor and is formed in a slit shape comprising a plurality of slits disposed in parallel with the data bus line (6). The pixel electrode (7) is insulated with the counter electrode (5) by a gate insulating film (not illustrated) and is electrically in contact with a source electrode (6a) of TFT (10).

However, conventional FFS mode LCD has a narrow distance (L1) between a gate bus line and a common bus line, thereby increasing generation probability of shorts between them. As a result, the quality of product is degraded. That is, when a short is generated between the lines, a high voltage loaded on the gate bus line is loaded on the common bus line. Accordingly, the high voltage may cause the common bus line to be defective, thereby deteriorating the product quality.

SUMMARY OF THE INVENTION

Therefore, an object of the present invention is to provide a FFS mode LCD preventing the generation of shorts between a gate bus line and a common bus line.

And, another object of the present invention is to provide a FFS mode LCD preventing degradation of products due to a short between the lines.

In order to achieve the above objects, the FFS mode LCD according to the present invention comprises: a transparent insulating substrate; a plurality of gate bus line arranged in selected direction on the transparent insulating substrate, the gate bus line is arranged so that each element of the pair separated at a first distance is arranged a plurality of pairs at a second distance wider than a first distance; a plurality of common bus lines arranged on the centers of each gate bus line separated at the second distance, being in parallel with the gate bus line; a plurality of data bus lines arranged crossing with the gate bus line and common bus line to define a unit pixel; a thin film transistor disposed at the intersection of the gate bus line and data bus line; a counter electrode disposed in a unit pixel area and made of a transparent conductor, being in contact with the common bus line; and a pixel electrode overlapping with the counter electrode in the unit pixel and made of a transparent conductor, being in contact with the thin film transistor.

The counter electrode may be disposed in each unit pixel area or one counter electrode of a body type may be disposed in two unit pixel areas defined by a gate bus line.

The common bus line may be formed in a line type or it may comprise a first part of a line type and a second part. The first part is disposed in parallel with the gate bus line, being in contact with a part of the counter electrode and the second part is protruded from the first part in a unit pixel, disposed in parallel with the data bus line, being in contact with both edges of the counter electrode.

BRIEF DESCRIPTION OF THE DRAWINGS

The above objects, and other features and advantages of the present invention will become more apparent after a reading of the following detailed description when taken in conjunction with the referenced drawings.

DETAILED DESCRIPTION OF THE INVENTION

Figure 1:
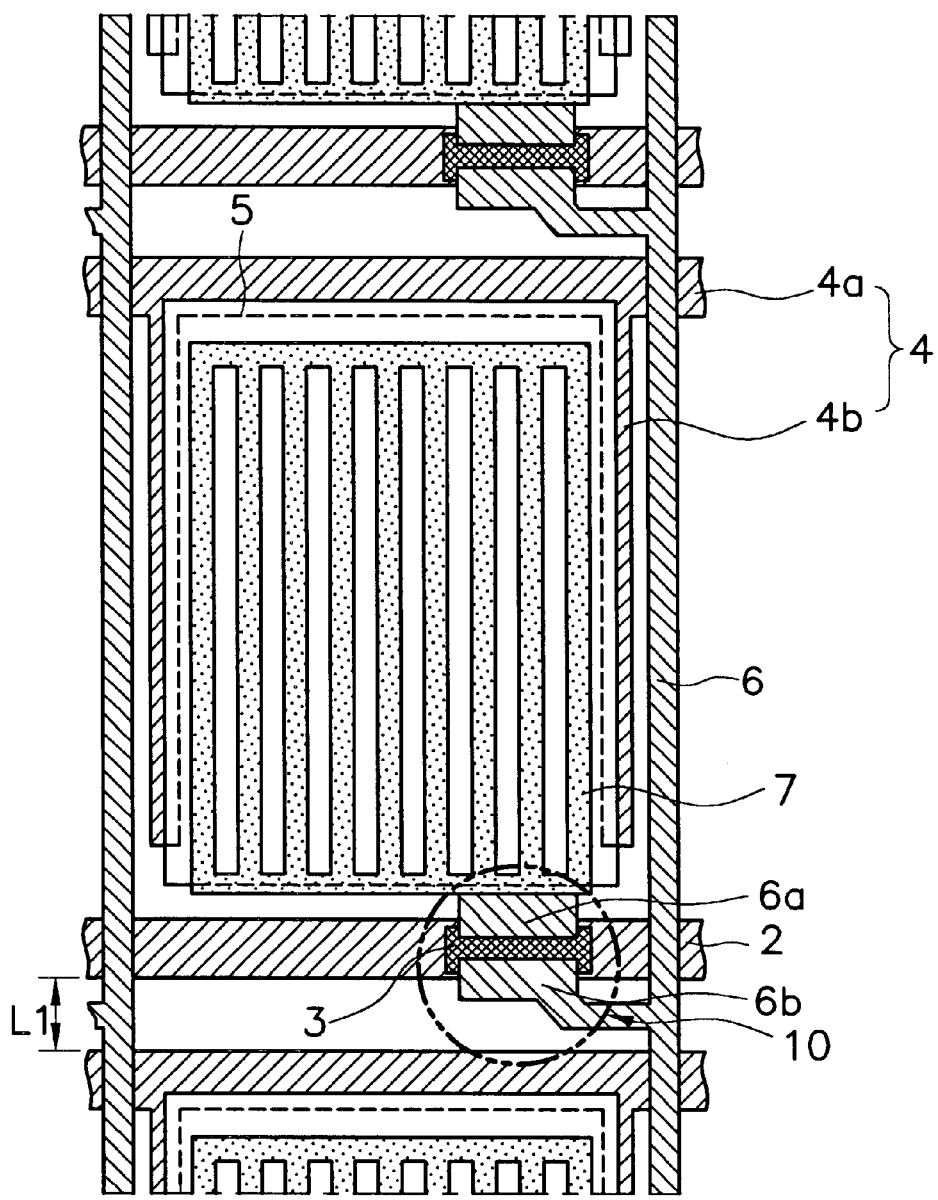
FIG. 1 shows an array substrate of conventional FFS mode LCD.
Figure 2:
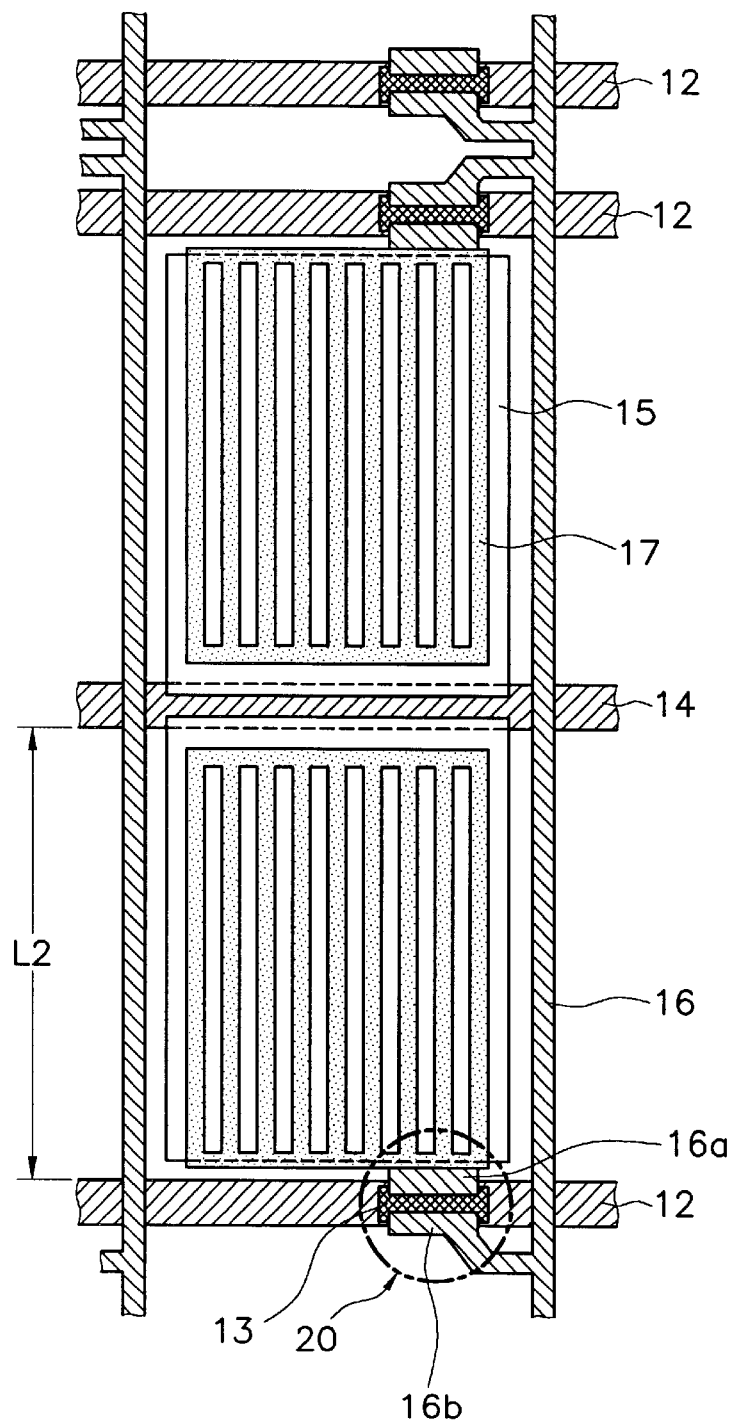
FIG. 2 shows an array substrate of FFS mode LCD according to a preferred embodiment of the present invention.

FIG. 2 shows an array substrate of FFS mode LCD according to a preferred embodiment of the present invention.

Referring to FIG. 2, a plurality of gate bus lines (12) are arranged in a line on a transparent insulating substrate (not illustrated). The gate bus lines (12) are arranged so that each element of the pair separated at a first distance is arranged a plurality of pairs at a second distance wider than a first distance. Common bus lines (14) are arranged in parallel with the gate bus line (12) on the centers of each gate bus line (12) separated at a second distance. A plurality of data bus lines (16) are arranged crossing with the gate bus line (12) and the common bus line (14), thereby defining a unit pixel.

Herein, the unit pixel is defined by one gate bus line (12), one common bus line (14), and a pair of data bus lines (16). Therefore, the second distance between the gate bus lines corresponds to the size of two unit pixels and the common bus line (14) is disposed to define the size of each unit pixel.

A TFT (20) is then disposed as a switching device near the intersection of the gate bus line (12) and the data bus line (16). The TFT (20) comprises a gate electrode that is a part of the gate bus line (12), a semiconductor layer (13) disposed on the gate electrode, a drain electrode (16b) which is protruded from the data bus line (16) to overlap with one side of the semiconductor layer (13), and a source drain electrode (16a) overlapping with the other side of the semiconductor layer (13).

A counter electrode (15) is disposed in each unit pixel. The counter electrode (15) is made of a transparent conductor in a plate type. And, counter electrodes are in contact with one common bus line (14) even when the counter electrodes are disposed in two unit pixels defined by the gate bus lines (12) separated at the second distance.

A pixel electrode (17) is disposed in the unit pixel to overlap with the counter electrode (15). The pixel electrode (17) is made of a transparent conductor in a slit type. And, the electrode (17) is insulated with the counter electrode (15) by a gate insulating film (not illustrated), being in contact with a source electrode (16a) of the TFT (20).

In the array substrate of the FFS mode LCD according to the present invention as described above, a distance (L2) between a gate bus line (12) and a common bus line (14) is wider when compared to the conventional distance (L1), thereby remarkably decreasing the generation probability of shorts between the lines.

While the gate bus lines (12) to be dispose at the first distance may cause a short between them. But since one common bus line (14) is disposed in two unit pixels unlike a conventional structure that one common bus line is disposed in one unit pixel, the distance between gate bus lines (12) may be increased. As a result, the distance between the gate bus lines (12) is increased, thereby preventing the short between the gate bus lines (12).

Consequently, according to a FFS mode LCD of the present invention, a short between a common bus line and a gate bus line may be prevented by optimizing the structure thereof, thereby improving a quality of common bus line and preventing deterioration of products.

Figure 3:
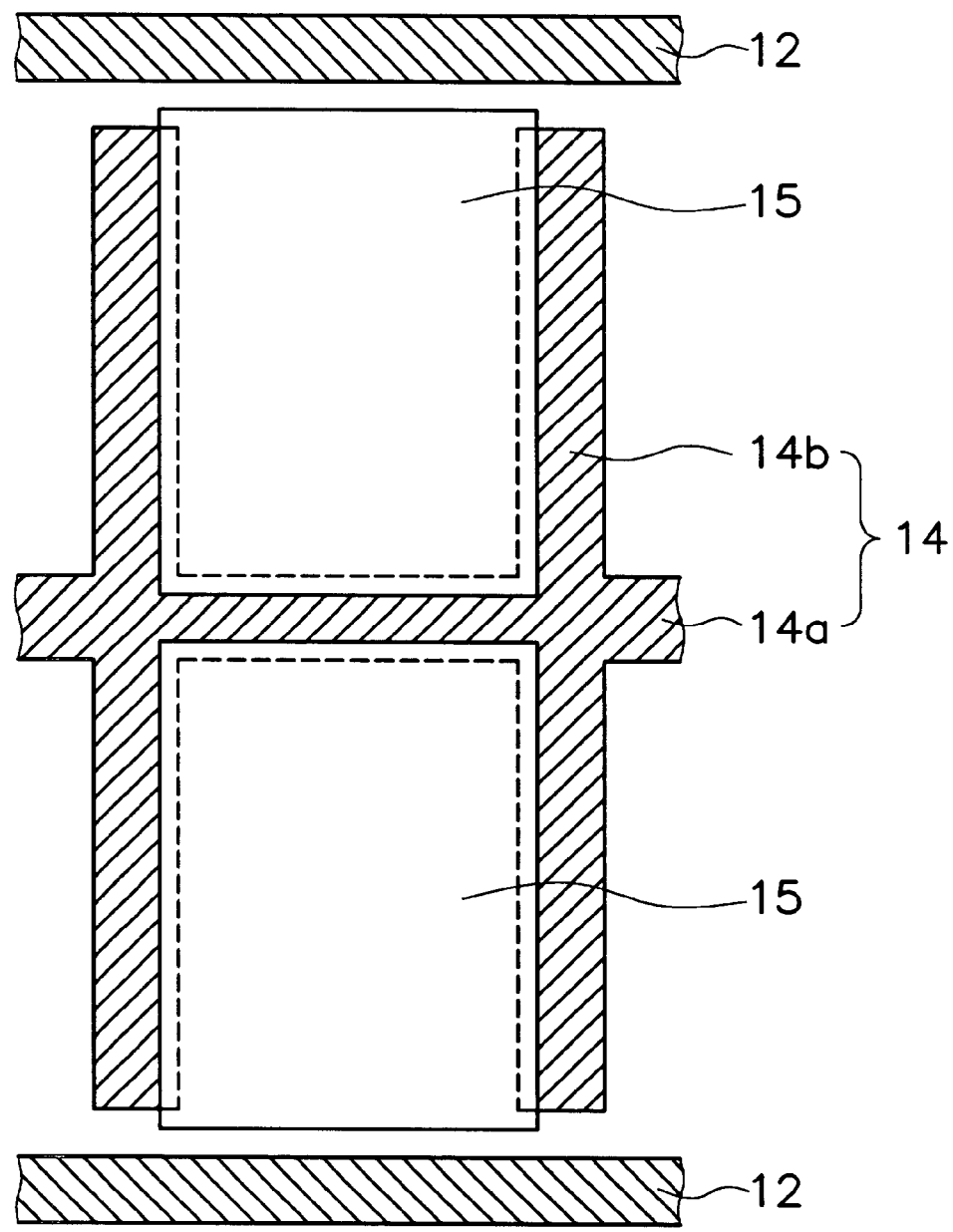
FIGS. 3 and 4 show a counter electrode and a common bus line of FFS mode LCD according to another preferred embodiment of the present invention.
Figure 4:
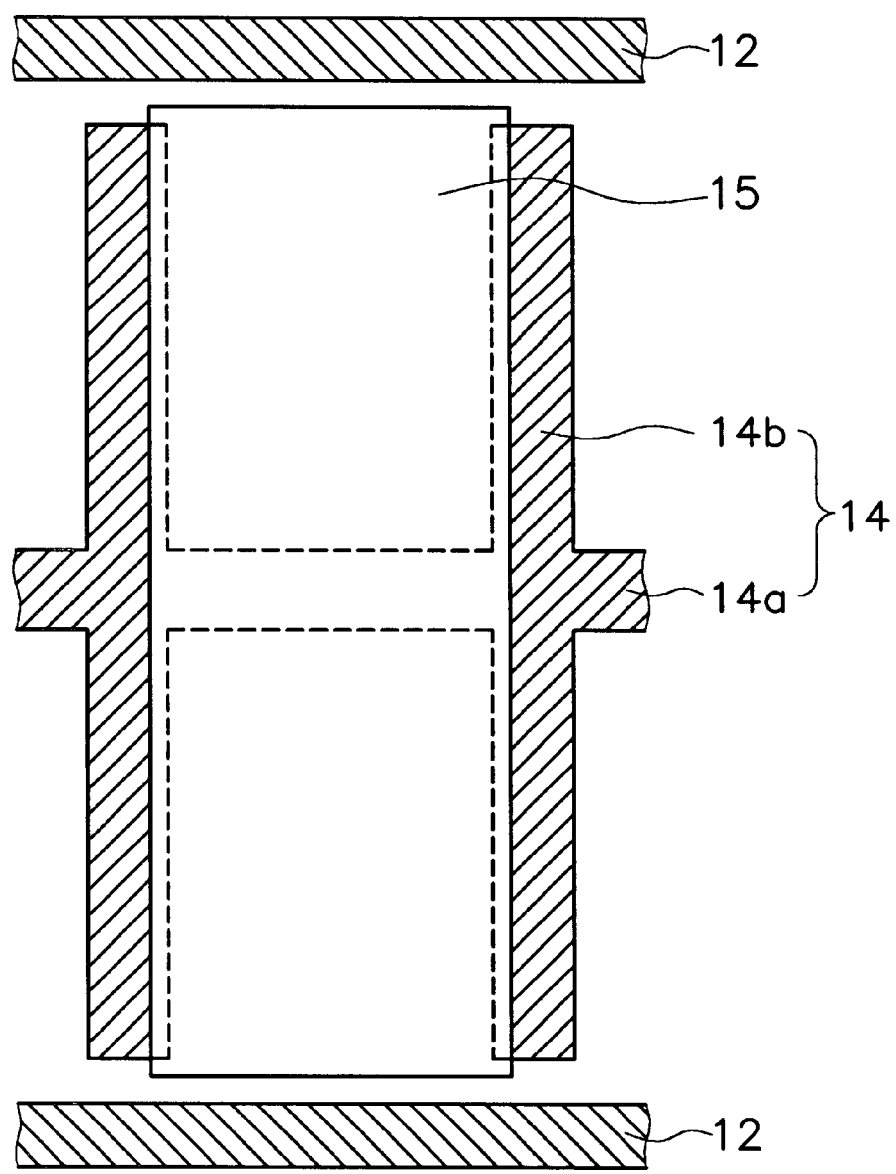

FIGS. 3 and 4 show a counter electrode and common bus line of FFS mode LCD according to another embodiment of the present invention.

Referring to FIGS. 3 and 4, a common bus line (14) is formed in a H-shape in two adjacent unit pixels. That is, the common bus line (14) comprises a first part (14a) of a line type which is disposed in parallel with a gate bus line (12) to define a unit pixel and a second part (14b) which is protruded from the first part (14a) and is disposed in parallel with a data bus line (16), overlapping with both edges of the counter electrode to be a shading means.

The counter electrode (15) is formed in a plate-shape and may be disposed in each unit pixel as shown in FIG. 3 or disposed in a body type in two unit pixels defined by the gate bus lines (12). When the counter electrode (15) is disposed in a body type in two unit pixels, an etching margin to a transparent conductor is increased and the contact resistance is decreased by enlarging the contact area with the common bus line (14).

As described above, according to the present invention, the structure of a gate bus line and a common bus line is transformed to prevent generation of defects due to a short between the lines, thereby improving the yield.

While this invention has been particularly shown and described with reference to preferred embodiments thereof, it will be understood by those skilled in the art that various changes in form and details may be made to the described embodiments without departing from the spirit and scope of the invention as defined by the appended claims.

What is claimed is:

1. A fringe field switching mode liquid crystal display comprising:

a transparent insulating substrate;

a first gate bus line and a second gate bus line arranged in a first direction on the transparent insulating substrate, wherein the first and second gate bus lines arc separated by a first distance;

a common bus lines arranged in the first direction between the first and second gate bus lines along the middle of the first distance;

a plurality of data bus lines arranged in a second direction crossing the first and second gate bus lines and the common bus line arranged in the first direction, wherein a first unit pixel is formed by a pair of data bus lines intersecting the first gate bus line and the common bus line and a second unit pixel is formed by the pair of data bus lines intersecting the common bus line and the second gate bus line;

a thin film transistor for each unit pixel disposed adjacent the intersection of each of the first and second gate bus lines and the corresponding one of the intersecting data bus lines;

a counter electrode disposed in each of the first and second unit pixels and made of a transparent conductor, the counter electrode being in contact with the common bus line; and a pixel electrode disposed in each of the first and second unit pixels and made of a transparent conductor, the pixel electrode overlapping with the counter electrode and being in contact with the corresponding thin film transistor.

2. The fringe field switching mode liquid crystal display according to claim 1, wherein the common bus line further comprises a first common bus line part and second common bus line parts, wherein the first common bus line part linearly extends in the direction parallel to the gate bus line in the first unit pixel and a second common bus line parts protrude from the first common bus line part and linearly extend in the direction parallel to the pair of data bus lines and along both edges of the counter electrode in each of the pixel units.

3. The fringe field switching mode liquid crystal display according to claim 1, wherein the counter electrode in each of the first and second unit pixels is formed in a plate shape.

4. The fringe field switching mode liquid crystal display according to claim 1, wherein the counter electrode disposed in each of the first and second unit pixels is made from one continuous piece of a transparent conductor.

5. The fringe field switching mode liquid crystal display according to claim 1, wherein the pixel electrode comprises a slit.

\* \* \* \* \*